(12) United States Patent
Tokuda

(10) Patent No.: US 10,359,120 B2
(45) Date of Patent: Jul. 23, 2019

(54) FLUID CONTROLLER

(71) Applicant: FUJIKIN INCORPORATED, Osaka-shi (JP)

(72) Inventor: Ichiro Tokuda, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 18 days.

(21) Appl. No.: 15/562,923

(22) PCT Filed: Jan. 24, 2017

(86) PCT No.: PCT/JP2017/002336
§ 371 (c)(1),
(2) Date: Sep. 29, 2017

(87) PCT Pub. No.: WO2017/130959
PCT Pub. Date: Aug. 3, 2017

(65) Prior Publication Data
US 2018/0087678 A1 Mar. 29, 2018

(30) Foreign Application Priority Data

Jan. 26, 2016 (JP) ................................. 2016-012154

(51) Int. Cl.
*F16K 7/16* (2006.01)
*F16K 7/17* (2006.01)
(Continued)

(52) U.S. Cl.
CPC .................. *F16K 7/17* (2013.01); *F16K 7/16* (2013.01); *F16K 31/1221* (2013.01);
(Continued)

(58) Field of Classification Search
None
See application file for complete search history.

(56) References Cited

U.S. PATENT DOCUMENTS

| 7,370,664 B2 * | 5/2008 | Glime | F16K 1/34 |
| | | | 137/375 |
| 7,802,771 B2 * | 9/2010 | Tsubota | F16K 31/1221 |
| | | | 251/331 |

(Continued)

FOREIGN PATENT DOCUMENTS

| JP | 3752586 B2 | 3/2006 |
| JP | 2007-528478 A | 10/2007 |
| JP | 2015-215028 A | 12/2015 |

OTHER PUBLICATIONS

International Search Report dated Apr. 11, 2017, issued for PCT/JP2017/002336.

*Primary Examiner* — Robert K Arundale
*Assistant Examiner* — Daphne M Barry
(74) *Attorney, Agent, or Firm* — Locke Lord LLP

(57) ABSTRACT

Provided is a fluid controller capable of cost reduction and performance improvement. Movable members 12 and 13 moved manually or automatically and for moving the disk 9 are tubular in shape and include a fitting portion 13a to be fitted to an outer periphery of the disk 9. The disk 9 is provided with a flange portion 9c, and the tubular movable members 12 and 13 are provided at a lower end portion thereof with a flange portion 35 to be brought into contact with the flange portion 9c of the disk 9 from above.

4 Claims, 5 Drawing Sheets

(51) Int. Cl.
  *F16K 31/60*  (2006.01)
  *F16K 31/122*  (2006.01)
  *F16K 31/143*  (2006.01)
  *F16K 31/50*  (2006.01)

(52) U.S. Cl.
  CPC ........ *F16K 31/1225* (2013.01); *F16K 31/143* (2013.01); *F16K 31/50* (2013.01); *F16K 31/60* (2013.01)

(56) References Cited

U.S. PATENT DOCUMENTS

| | | | |
|---|---|---|---|
| 8,444,111 B2 * | 5/2013 | Hirose | F16K 31/1221 137/385 |
| 2005/0199292 A1 | 9/2005 | Stedman et al. | |
| 2006/0175563 A1 | 8/2006 | Tsubota et al. | |
| 2008/0173834 A1 * | 7/2008 | Aoyama | F16K 7/16 251/89 |
| 2012/0319024 A1 * | 12/2012 | Hirose | F16K 7/14 251/319 |
| 2015/0323081 A1 | 11/2015 | Hasunuma | |
| 2015/0354722 A1 * | 12/2015 | Gamache | F16K 31/1262 251/25 |

\* cited by examiner

FLUID CONTROLLER

TECHNICAL FIELD

The present invention relates to a fluid controller having both functions of a manual valve and an automatic valve or having either of the functions.

BACKGROUND ART

A publicly known fluid controller includes: a diaphragm moved so as to open and close a fluid passage; a diaphragm presser for moving the diaphragm to a closing position in which the fluid passage is in a closed state and an opening position in which the fluid passage is in an open state; a disk for holding at an end portion thereof the diaphragm presser; and a movable member for moving the disk to the closing position or the opening position manually or automatically.

Patent Literature 1 discloses a fluid controller having an advantageous effect that installation cost and space may be drastically reduced because an opening/closing mechanism consisting of the conventional automatic valve and manual valve may be replaced by the fluid controller.

Patent Literature 1 indicates that the movable member (vertically movable member) used therein includes a rodlike body (for manual opening/closing) and a tubular body (for automatic opening/closing). The movable member of either type is designed to press at an end portion thereof (lower end portion) the same surface (upper surface) of the disk.

CITATION LIST

Patent Literature

Patent Literature 1: Japanese Patent No. 3752586

SUMMARY OF INVENTION

Technical Problem

In the fluid controller disclosed in Patent Literature 1, not only the advantageous effect obtained by replacing the opening/closing mechanism consisting of the conventional automatic valve and manual valve by the fluid controller of Patent Literature 1, cost reduction and performance improvement have been further required.

The fluid controller according to Patent Literature 1, in which the tubular body at the lower end portion presses the upper surface of the disk, requires the pressing portion and the like to have a high degree of precision in machinability. Therefore, time is required in order to obtain the precision, and reducing the time has been desired. In addition, further cost reduction and performance improvement are issues to be addressed.

Conventionally, even in the case where the disk is manufactured with the highest possible precision in machinability, if there exists a distance from the upper surface of the disk, which is in contact with the movable member, through the diaphragm presser, to a contact surface with the diaphragm, even a slight difference in the machining precision exerts a great influence on the pressing force. In addition, in the case where the upper surface of the disk is pressed by the tubular movable member, if there exists an uneven contact between the end portion of the tubular movable member and the upper surface of the disk due to the inferior machining precision and the like, uneven pressing force is to be applied onto the disk, that is, a pressing force that causes the disk to be inclined is to be applied. The disk is designed to stop the flow of the fluid by pressing the diaphragm via the diaphragm presser against a valve seat. However, when the disk is inclined, the pressing force against the diaphragm becomes uneven and the force pressing against the valve seat in turn becomes uneven. As a result, there arises a possibility that the valve seat allows the fluid to leak. Therefore, high precision is required with respect to the shape, arrangement, and the like, of the tubular body and the disk. Furthermore, for example, because the casing and the movable member are normally manufactured by cutting, reduction in cost for the processing in the case of cutting has been required.

Even a fluid controller using either of the functions of the manual valve and the automatic valve uses a tubular movable member, in some cases. Such a fluid controller also has the same issues as the fluid controller disclosed in Patent Literature 1.

An object of the present invention is to provide a fluid controller capable of cost reduction and performance improvement.

Solution to Problem

The fluid controller in accordance with the present invention is a fluid controller comprising: a diaphragm moved so as to open and close a fluid passage; a diaphragm presser for moving the diaphragm to a closing position in which the fluid passage is in a closed state and an opening position in which the fluid passage is in an open state; a disk for holding at an end portion thereof the diaphragm presser; and a movable member for moving the disk to a closing position or an opening position manually or automatically, wherein the movable member includes a tubular fitting portion to be fitted to an outer periphery of the disk, and the disk is provided at apart thereof with a flange portion coming into contact with an end portion of the movable member at a time of movement of the movable member.

The fluid controller may be an automatic valve or may be a manual valve. Alternatively, the fluid controller may have both of the automatic valve and the manual valve. In the case where the fluid controller has the function of the automatic valve, the fluid controller may be of normally open type that opens the fluid passage when automatic opening and closing means is off, or may be of normally closed type that closes the fluid passage when the automatic opening and closing means is off.

The disk has a columnar portion and a flange portion. The tubular movable member does not press the columnar portion of the disk, but presses the flange portion of the disk. The flange portion may be integrally formed with the columnar portion, or may be formed separately from the columnar portion. Because of the above-described configuration, the distance between the movable member and the diaphragm is short, whereby it is possible to decrease the inclination of the disk. Therefore, the fluid controller improves the precision, resulting in cost reduction and performance improvement because the time required for obtaining the sufficient precision is shortened.

Preferably, moving means for moving the movable member is means for automatic movement, which is performed by introduction or discharge of a compressed fluid to a compressed fluid introduction chamber formed in a casing, the casing includes a first casing and a second casing formed separately from the first casing, a first cylinder portion and a second cylinder portion partitioned by a counter plate are formed in the casing, and the means for automatic movement includes a first piston guided in the first cylinder portion and moving integrally with the movable member, and a second piston guided in the second cylinder portion and moving integrally with the movable member, and the counter plate is provided with a first screw portion and a second screw portion, the first screw portion is screwed to the first casing, and the second screw portion is screwed to the second casing.

The first cylinder portion and the second cylinder portion are formed by providing a recess in the first casing. When the recess thus provided is deep, the cutting must be performed deeply, which results in increased cost for the processing. Providing the screw portions on both sides of the counter plate and using the counter plate as a coupling member for coupling the first casing and the second casing shortens the length of the first casing, that is, shallows the recess of the first casing. As a result, the depth to be processed is reduced, whereby cost reduction is achieved.

Preferably, the movable member consists of: a second tubular body having the fitting portion; and a first tubular body formed separately from the second tubular body, and the first piston and the second piston are both formed separately from the movable member.

Because of the above-described configuration, when the tubular movable member is obtained by cutting, the diameter of the material can be reduced. This reduces an amount to be processed, whereby both of the material cost and the processing cost may be reduced.

Preferably, the fluid controller further comprises: manual movement means for moving the disk manually, wherein the manual movement means includes a rodlike movable member for pressing the disk in one direction by being moved by manual operation, and the rodlike movable member is moved by manual operation to an automatic opening and closing disabled position in which an end portion of the rodlike movable member presses a middle portion of a top surface of the disk in one direction and to an automatic opening and closing enabled position in which the end portion is away from the middle portion of the top surface of the disk, the tubular movable member is fitted to the rodlike movable member in a relatively movable manner, and is moved to a closing position in which the tubular movable member is biased by an elastic member and presses the disk in one direction and to an opening position in which an end portion of the tubular movable member is away from a flange of the disk by the means for automatic movement, and a closed state in an event of emergency is realized in which the rodlike movable member is moved to the closing position when the tubular movable member is in the opening position.

With the configuration described above, operating the rodlike movable member may be performed irrespective of a force applied from the automatic moving means to the tubular movable member. Therefore, a fluid controller (diaphragm valve) capable of automatic and manual operations with a compact structure may be obtained.

The diaphragm may be moved to the closing position or the opening position by its own elastic force. Alternatively, the diaphragm may be moved to the closing position or the opening position by other factors such as the pressure of the fluid.

Advantageous Effects of Invention

The fluid controller in accordance with the present invention is capable of decreasing the inclination of the disk because the distance between the movable member and the diaphragm is short. Therefore, the fluid controller in accordance with the present invention improves the precision, resulting in cost reduction and performance improvement because the time required for obtaining the sufficient precision is shortened.

REFERENCE SIGNS LIST

Figure 1:
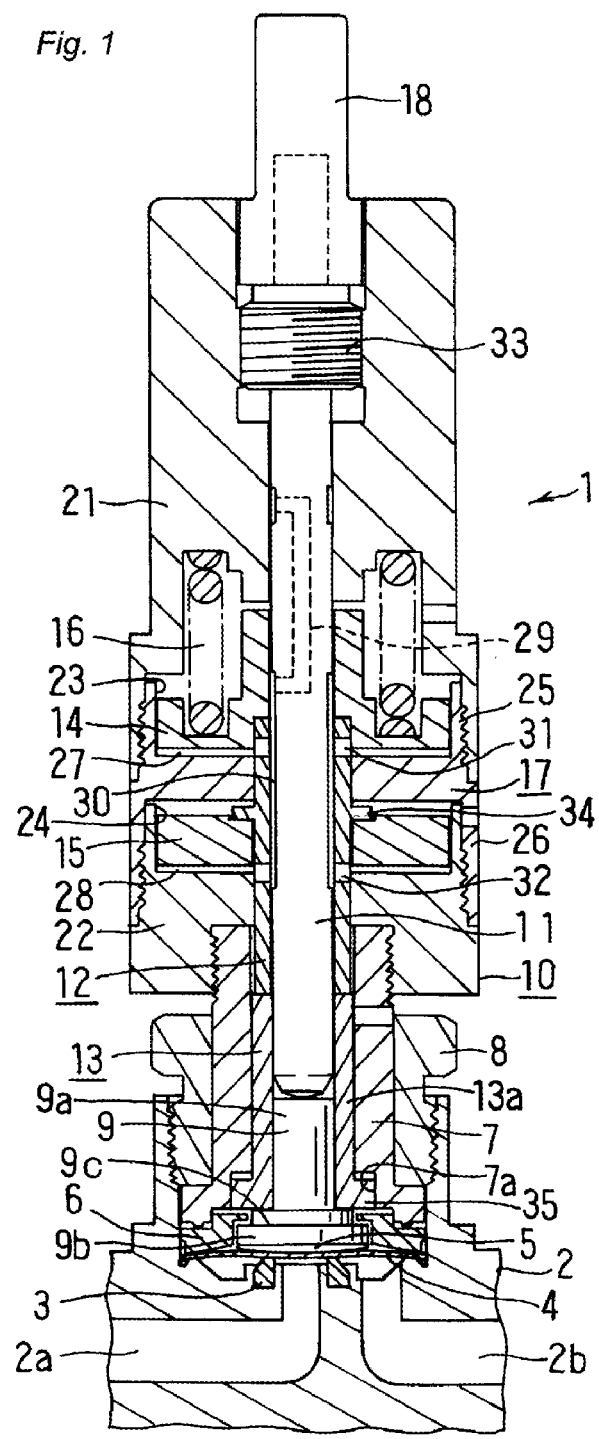
FIG. 1 is a vertical cross-sectional view of a fluid controller in accordance with an embodiment of the present invention, showing an automatic opening and closing disabled state.

1: fluid controller
2: valve body
2a, 2b: fluid passage
4: diaphragm
5: diaphragm presser
9: disk
9c: small-diameter flange portion (flange portion)
10: casing
11: rodlike body (rodlike movable member)
12: upper tubular body (tubular movable member)
13: lower tubular body (tubular movable member)
13a: fitting portion
14: upper piston (first piston)
15: lower piston (second piston)
16: compression coil spring (elastic member)
17: counter plate
21: upper casing (first casing)
22: lower casing (second casing)
23: upper cylinder portion (first cylinder portion)
24: lower cylinder portion (second cylinder portion)
25: upper screw portion (first screw portion)
26: lower screw portion (second screw portion)
27, 28: compressed fluid introduction chamber

DESCRIPTION OF EMBODIMENTS

Embodiments of the present invention will be described below with reference to the drawings. In the following description, the terms "upper" and "lower", and "right" and "left" refer respectively to the upper and lower, and the right and left sides of the drawings. The terms "upper" and "lower" are used for convenience of description. In practice, installation may be performed upside down or the upper and lower sides may be directed to the right and left sides. For easy-to-understand drawings, seal members such as an O-ring are not shown.

Figure 2:
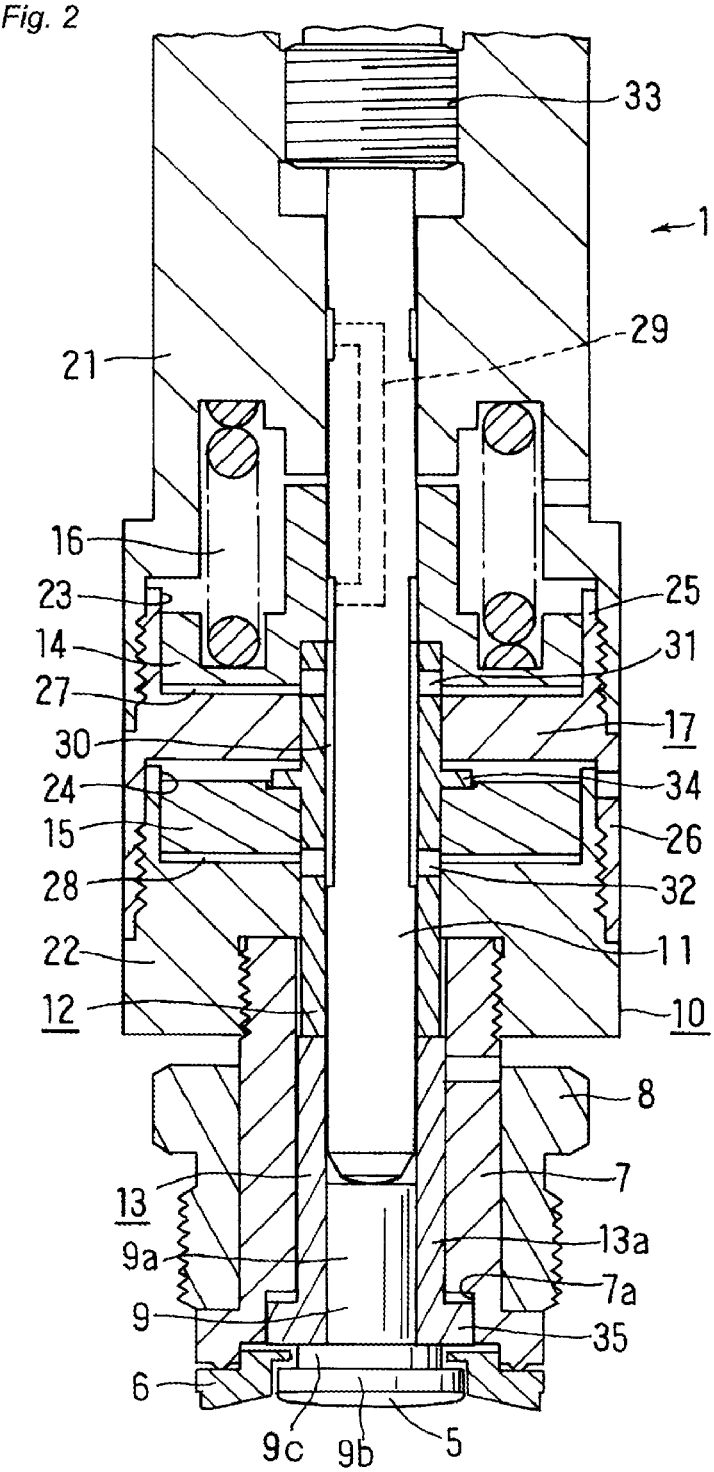
FIG. 2 is an enlarged view of a main part of FIG. 1 (showing the automatic opening and closing disabled state).
Figure 3:
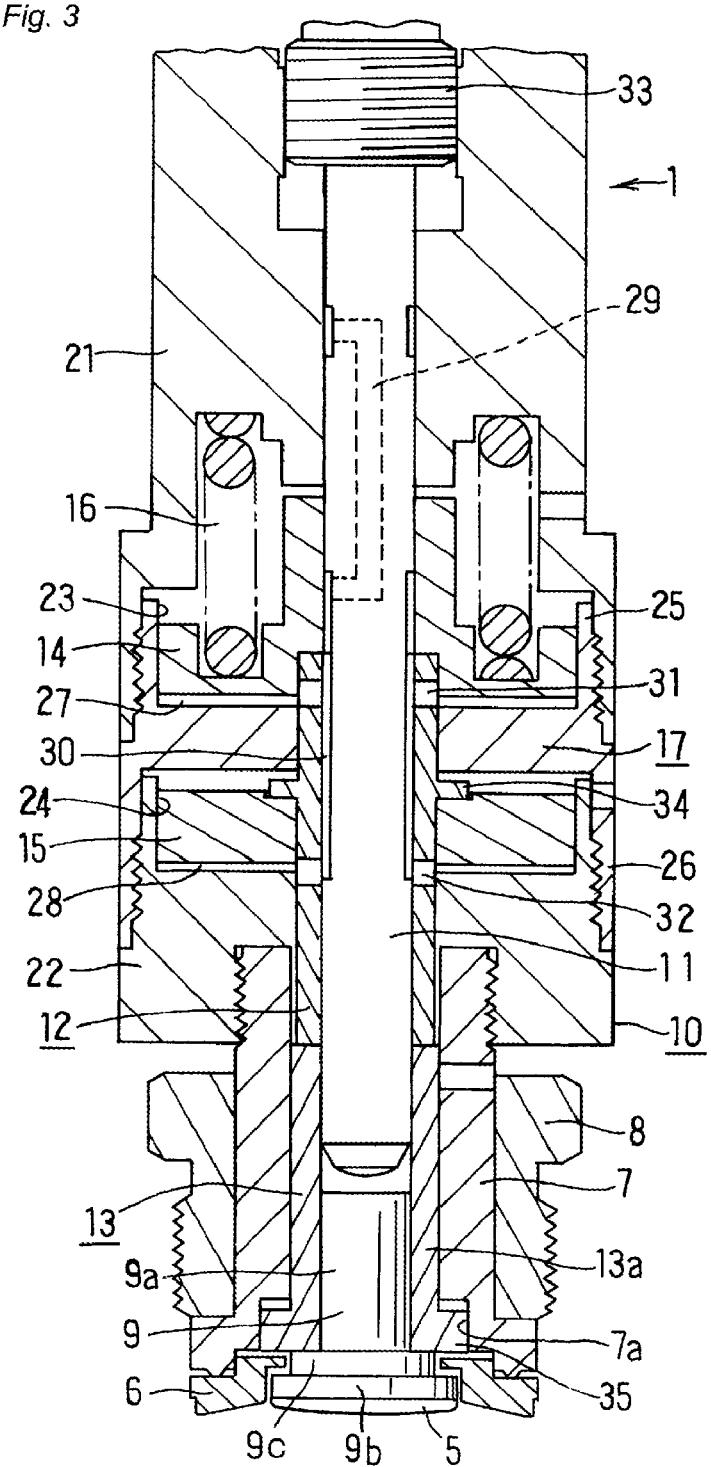
FIG. 3 is an enlarged view of a main part of the fluid controller, showing a closed state of an automatic opening and closing enabled state.
Figure 4:
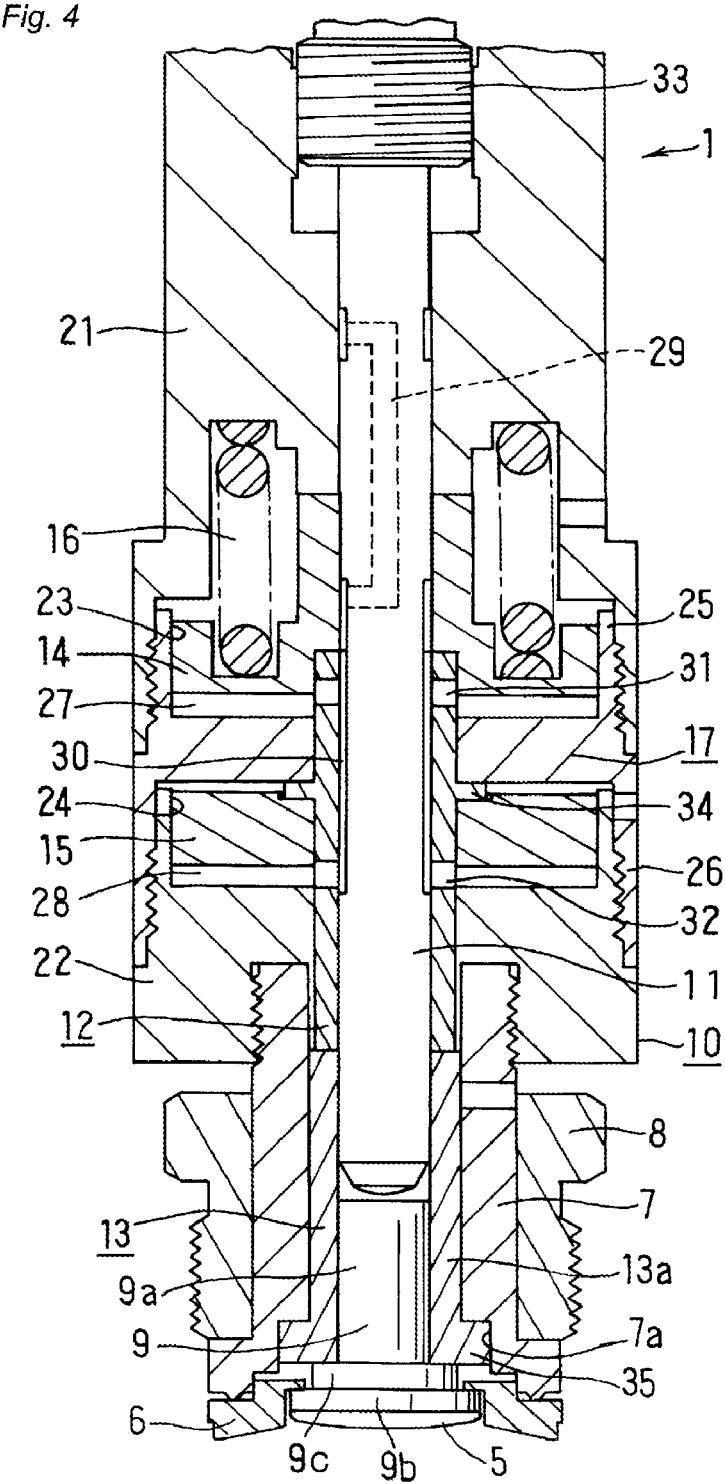
FIG. 4 is an enlarged view of a main part of the fluid controller, showing an open state of the automatic opening and closing enabled state.
Figure 5:
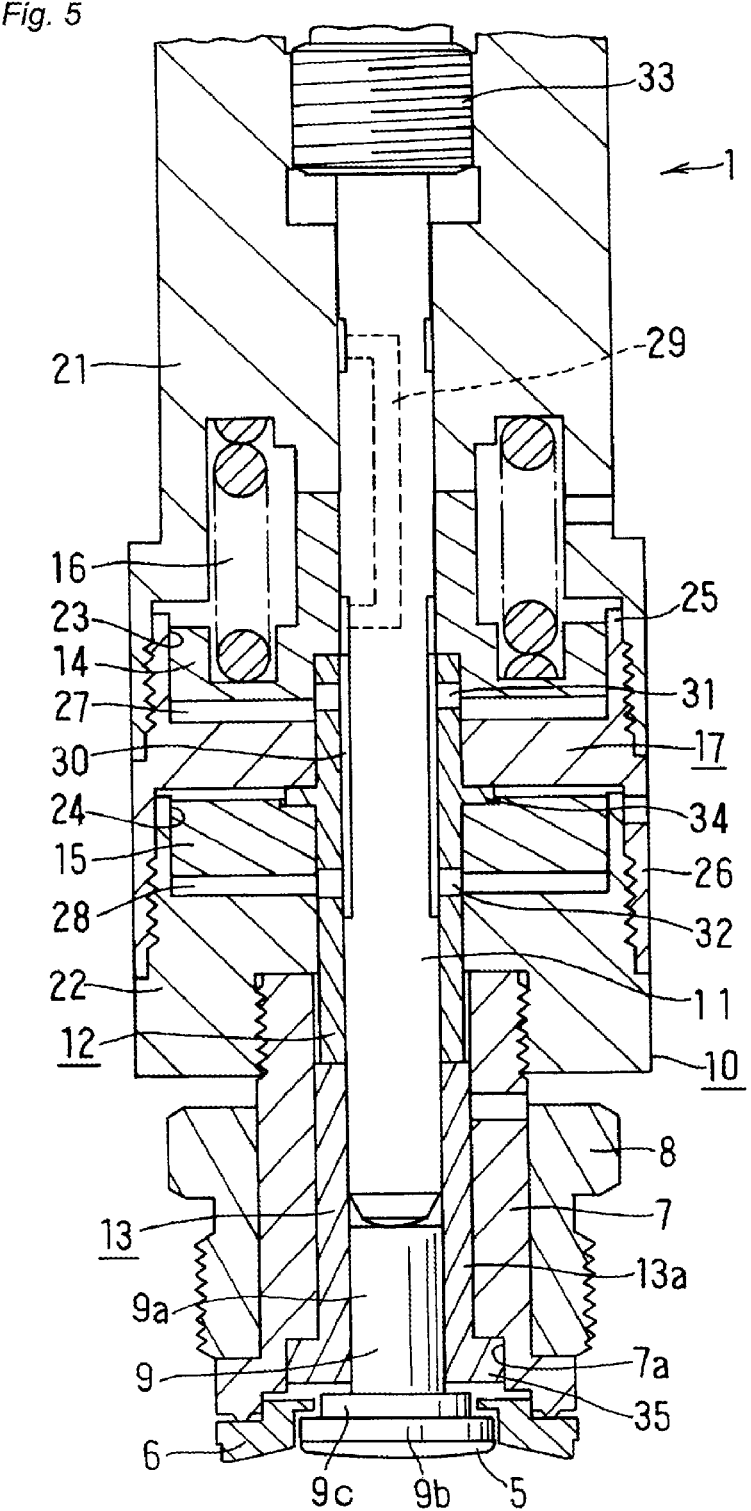
FIG. 5 is an enlarged view of a main part of the fluid controller, showing a closed state in the event of an emergency.

FIG. 1 to FIG. 5 show a fluid controller in accordance with an embodiment of the present invention. The fluid controller has both of the function of an automatic valve and the function of a manual valve. The fluid controller thus includes a tubular movable member for the function of the automatic valve, and a rodlike movable member for the function of the manual valve. FIG. 1 and FIG. 2 show an automatic opening and closing disabled state in which upper and lower tubular bodies 12 and 13 as the tubular movable members and a rodlike body 11 as the rodlike movable member are both in a closing position. FIG. 3 shows a closed state in an automatic opening and closing enabled state in which the upper and lower tubular bodies 12 and 13 are in the closing position and the rodlike body 11 is in an opening position. FIG. 4 shows an open state in the automatic opening and closing enabled state in which the rodlike body 11 is in the opening position and the upper and lower tubular bodies 12 and 13 are also in the opening position. FIG. 5 shows a closed state in the event of an emergency in which the rodlike body 11 is moved to the closing position when the upper and lower tubular bodies 12 and 13 are in the opening position.

As shown in FIG. 1, the fluid controller 1 includes: a valve body 2 having a fluid inflow passage 2a and a fluid outflow passage 2b; an annular valve seat 3 provided on a peripheral edge of an upward opening of the fluid inflow passage 2a; a diaphragm 4 that is pressed (moves in a closing direction) against the annular valve seat 3 or is separated (moves in an opening direction) from the annular valve seat 3 to close or open the fluid inflow passage 2a; a vertically movable diaphragm presser 5 for pressing a middle portion of the diaphragm 4; a diaphragm holding ring 6 for pressing an outer peripheral edge portion of the diaphragm 4; a cylindrical bonnet 7 having a lower end portion inserted into a recess formed in the valve body 2 and extending upward; a tubular male screw member 8 that is screwed into the recess of the valve body 2 to fix the bonnet 7 to the valve body 2; a disk 9 for holding at a lower end portion thereof the diaphragm presser 5; a casing 10 having a lower end portion that is fixed to an upper end portion of the bonnet 7; a rodlike body (rodlike movable member) 11 provided in the casing 10 and having a lower end portion that is inserted to the bonnet 7 in a vertically movable manner; upper and lower tubular bodies (tubular movable members) 12 and 13 fitted in a vertically movable manner relative to the rodlike body 11; upper and lower pistons 14 and 15; a compression coil spring (elastic member for biasing the tubular bodies) 16 biasing the upper and lower tubular bodies 12 and 13 downward via the upper piston 14; a counter plate 17 that is fitted below the upper piston 14 and relative to the upper tubular body 12 in a vertically movable manner to be fixed to the casing 10; and an operation handle 18 provided at an upper end portion of the rodlike body 11.

The disk 9 has a columnar portion 9a and two-step flange portions 9b and 9c provided at a lower end portion of the columnar portion 9a. The lower end portion of the columnar portion 9a is provided with a recess in which the diaphragm presser 5 is fitted to be fixed. The two-step flange portions 9b and 9c are specifically: a large-diameter flange portion 9b at the lower side; and a small-diameter flange portion 9c provided on the immediately upper side of the large-diameter flange portion 9b.

The casing 10 consists of: an upper casing (first casing) 21; and a lower casing (second casing) 22 that is formed separately from the upper casing 21 and has a lower end portion that is fixed to the upper end portion of the bonnet 7.

The casing 10 is partitioned vertically by the counter plate 17, whereby an upper cylinder portion (first cylinder portion) 23 and a lower cylinder portion (second cylinder portion) 24 defined by the counter plate 17 are formed in the casing 10. In the upper cylinder portion 23, the upper piston (first piston) 14 is provided in a vertically movable manner. In the lower cylinder portion 24, the lower piston (second piston) 15 is provided in a vertically movable manner.

The counter plate 17 includes: a cylindrical upper screw portion (first screw portion) 25 that projects upward from an upper surface of a platelike portion of the counter plate 17 and that is provided on an outer periphery thereof with a male screw; and a cylindrical lower screw portion (second screw portion) 26 that projects downward from a lower surface of the platelike portion of the counter plate 17 and that is provided on an inner periphery thereof with a female screw. The outer diameter of the lower screw portion 26 is equal to the outer diameter of the upper casing 21. The outer diameter of the upper screw portion 25 is smaller than the outer diameter of the lower screw portion 26.

The compression coil spring 16 has: an upper end portion that is received by a recess provided on a lower surface of a top wall portion of the upper casing 21; and a lower end portion that is received by a recess provided on an upper surface of the upper piston 14.

The upper casing 21 is provided on an inner periphery of a lower end portion thereof with a female screw to be screwed to the upper screw portion 25 of the counter plate 17. The lower casing 22 is provided on an outer periphery of an upper end portion thereof with a male screw portion to be screwed to the lower screw portion 26 of the counter plate 17. The upper casing 21 and the counter plate 17 are screwed together and the counter plate 17 and the lower casing 22 are screwed together, whereby the upper casing 21 is integrated with the lower casing 22.

In the conventional case, the counter plate is provided at a lower end portion thereof with a flange portion, and the flange portion is fitted to a stepped portion provided on the inner periphery of the upper casing, whereby the counter plate is fixed. The upper cylinder portion and the lower cylinder portion are formed by providing a recess in the upper casing. When the recess thus provided is deep, the cutting must be performed deeply, which results in increased cost for the processing.

In contrast to the conventional case, providing the screw portions 25 and 26 on both upper and lower sides of the counter plate 17 and using the counter plate 17 as a coupling member for coupling the upper casing 21 and the lower casing 22 shortens the length of the upper casing 21, that is, shallows the recess of the upper casing 21. As a result, the depth to be processed is reduced, whereby cost reduction is achieved.

In the upper cylinder portion 23, the lower side of the upper piston 14 is an upper compressed fluid introduction chamber 27. In the lower cylinder portion 24, the lower side of the lower piston 15 is a lower compressed fluid introduction chamber 28. To these upper and lower compressed fluid introduction chambers 27 and 28, compressed fluid is supplied, via an internal passage 29 provided inside the rodlike body 11, an external passage 30 formed by shaving an outer peripheral surface of the rodlike body 11, and upper and lower through holes 31 and 32 radially penetrating through the upper tubular body 12.

The upper and lower pistons 14 and 15 are formed separately from the upper and lower tubular bodies 12 and 13, respectively. The upper tubular body 12 has an upper end portion that is fitted to the upper piston 14 in a relatively upwardly immovable manner. The upper tubular body 12 has an intermediate portion that is provided with a flange 34 coming into contact with an upper surface of the lower position 15 from above. The lower tubular body 13 has a cylindrical fitting portion 13a to be fitted to the columnar portion 9a of the disk 9. The lower tubular body 13 has a lower end portion that is brought into contact with an upper surface of the small-diameter flange portion 9c of the disk 9 from above. The lower tubular body 13 is provided at the lower end portion with a flange portion 35.

The bonnet 7 is provided on an inner periphery thereof with an annular recess (guide portion) 7a for guiding the flange portion 35 of the lower tubular body 13 in a vertically movable manner. The lower tubular body 13, and therefore, the disk 9 and the diaphragm presser 5 are vertically movable in the annular recess 7a within a restricted range.

Because the upper piston 14 is biased downward by the compression coil spring 16, the upper tubular body 12 is biased downward by the compression coil spring 16. In a state where compression air is not introduced, the lower end portion of the upper tubular body 12 comes in contact with the upper surface of the lower tubular body 13. The downward biasing force of the compression coil spring 16 also acts via the flange portion 34 of the upper tubular body 12 onto the lower piston 15. The upper piston 14, the lower piston 15, the upper tubular body 12, and the lower tubular body 13 are moved vertically in an integrated manner.

When compressed air is introduced, through the internal passage 29, the external passage 30, the upper through hole 31, and the lower through hole 31, to the upper and lower compressed fluid introduction chambers 27 and 28, the upper and lower pistons 14 and 15 are moved upward by the compressed air. Along with this, the flange portion 34 of the upper tubular body 12 is pressed upward by the lower piston 15, whereby the upper tubular body 12 moves upward integrally with the lower piston 15. As a result, the lower end portion of the lower tubular body 13 is separated from the upper surface of the disk 9. At the point where the sum of the pressure of the compressed air that presses the lower piston 15 upward and the pressure of the compressed air that presses the upper piston 14 upward is balanced with the elastic force of the compression coil spring 16, the upper and lower tubular bodies 12 and 13 are stopped.

The upper piston 14, the lower piston 15, the internal passage 29, the external passage 30, the upper through hole 31, the lower through hole 32, the upper compressed fluid introduction chamber 27, the lower compressed fluid introduction chamber 28, and the like constitute means for automatic movement, which is performed by introduction or discharge of compressed fluid to the compressed fluid introduction chambers 27 and 28.

Near an upper end portion of the rodlike body 11, a male screw portion 33 is formed, which is screwed to a female screw portion formed on the upper casing 21. A portion that is contiguous to an upper end portion of the male screw portion 33 is coupled to the operation handle 18. When the operation handle 18 is rotated, the rodlike body 11 rotates. The male screw portion 33 in turn rotates relative to the female screw portion of the upper casing 21, and the rodlike body 11 vertically moves while rotating. The rotatable angle of the operation handle 18 is substantially 90 degrees (greater than or equal to 90 degrees).

The rodlike body 11, the operation handle 18, the male screw portion 33, the female screw portion of the upper casing 21 that is screwed to the male screw portion 33, and the like constitute means for manual movement, which is performed by vertically moving the disk 9 manually.

The state shown in FIG. 1 and FIG. 2, which is an enlarged view of FIG. 1, is an automatic opening and closing disabled state in which the rodlike body 11 as the rodlike movable member and the upper and lower tubular bodies 12 and 13 as the tubular movable members are both in the closing position. When compressed air is introduced into the upper and lower compressed fluid introduction chambers 27 and 28 in this state, even though the upper and lower tubular bodies 12 and 13 move upward, because the rodlike body 11 maintains the state of the disk 9 being pressed downward, the opening and closing operation by automatic opening and closing means is deactivated. Therefore, even when an opening operation to introduce compressed air to the compressed fluid introduction chambers 27 and 28 is performed, a passage leading from the fluid inflow passage 2a to the fluid outflow passage 2b is not opened and maintains a shut-off state.

When the operation handle 18 is moved to the automatic opening and closing enabled state from the state shown in FIG. 2, the rodlike body 11 as the rodlike movable member moves upward as shown in FIG. 3. The difference in FIG. 3 from FIG. 2 is the position (state) of the operation handle 18 and the rodlike body 11. Other members such as the upper and lower tubular bodies 12 and 13, the upper and lower pistons 14 and 15, the compression coil spring 16, the disk 9, the diaphragm presser 5, and the diaphragm 4 do not change from the state shown in FIG. 2.

When compressed air is introduced into the upper and lower compressed fluid introduction chambers 27 and 28 in the state shown in FIG. 3, the fluid controller 1 enters a state shown in FIG. 4 while the rodlike body 11 as the rodlike movable member is maintained to be moved upward. The difference in FIG. 4 from FIG. 3 is the position (state) of the upper and lower tubular bodies 12 and 13, the upper and lower pistons 14 and 15, the compression coil spring 16, the disk 9, the diaphragm presser 5, and the diaphragm 4. The upper and lower tubular bodies 12 and 13 and the upper and lower pistons 14 and 15 are moved upward against the elastic force of the compression coil spring 16, due to the compressed air having been introduced into the upper and lower compressed fluid introduction chambers 27 and 28. Along with this, the compression coil spring 16 is compressed, and a force pressing the disk 9, and therefore, the diaphragm presser 5 and the diaphragm 4 downward is removed. The diaphragm 4 is thus moved in the opening direction by a restoring force of the diaphragm 4 and the pressure of the fluid inside the fluid inflow passage 2a, whereby the passage leading from the fluid inflow passage 2a to the fluid outflow passage 2b is opened.

When the operation handle 18 is moved to an automatic opening and closing disabled position in the state shown in FIG. 4 where the fluid passages are in an open state, the fluid controller 1 enters a state shown in FIG. 5 where the rodlike body 11 as the tubular movable member is moved downward. The difference in FIG. 5 from FIG. 4 is the position (state) of the operation handle 18 and the rodlike body 11. Other members such as the upper and lower tubular bodies 12 and 13, the upper and lower pistons 14 and 15, the compression coil spring 16, the disk 9, the diaphragm presser 5, and the diaphragm 4 do not change from the state shown in FIG. 4. In this state, although the upper and lower tubular bodies 12 and 13 are in a state where the fluid passages are open, a state where the fluid passages are closed is obtained by downwardly moving the rodlike body 11 manually.

That is, in the event of an emergency, the fluid passage 2a in the valve body 2 may be shut-off by manual operation. This shut-off is not performed by the spring, but is performed by fastening the male screw portion 33. Therefore, even when the pressure of the fluid passage 2a is as high as, for example, 3500 psi, the shut-off may be securely performed. The state shown in FIG. 5 is the same as that where compressed air is introduced in the state shown in FIG. 2. The difference in FIG. 5 from FIG. 2 is the position (state) of the upper and lower tubular bodies 12 and 13, the upper and lower pistons 14 and 15, the compression coil spring 16, the disk 9, the diaphragm presser 5, and the diaphragm 4.

In the above-described fluid controller 1, when the state is changed from FIG. 2 to FIG. 5, the lower tubular body 13 is fitted at its fitting portion 13a to the disk 9 and presses the small-diameter flange portion 9c of the disk 9, whereby the distance from the lower tubular body 13 to the diaphragm 4 is shortened. As a result, inclination of the disk 9, when the movable member is made tubular in shape, is prevented. In addition, even if a pressing force is unevenly applied to the disk 9 under the influence of the machining precision for the tubular body 13 and a force so as to cause the disk 9 to incline is applied to the disk 9, the disk 9 does not incline because the disk 9 is fitted to the fitting portion 13a. As a result, a pressing force is evenly applied to the diaphragm 4, and the diaphragm 4 in turn applies the pressing force evenly to the valve seat 3. Because of these configurations, as compared to the conventional fluid controller in which the tubular movable member presses the upper surface of the disk 9, the fluid controller in accordance with the present invention improves the precision and shortens the time required for achieving the precision, which leads to the cost reduction and performance improvement.

The upper and lower pistons 14 and 15 are formed separately from the upper and lower tubular bodies 12 and 13, respectively. Therefore, as compared to a tubular body that is provided integrally with a piston, when the tubular bodies 12 and 13 are obtained by cutting, the diameter of the material can be reduced. This reduces an amount to be processed, whereby both of the material cost and the processing cost may be reduced. As for the upper and lower tubular bodies 12 and 13, although separate members are used, an integral tubular member may be used.

Furthermore, as for the tubular movable member, any configuration may be employed as long as the tubular movable member presses the flange portion 9c of the disk 9 and the rodlike movable member moves irrelevantly to the tubular movable member. For example, the tubular movable member may take a shape such as a square C-shape in cross section, that is, part of the tubular portion may be missing.

INDUSTRIAL APPLICABILITY

The present invention contributes to improvement of the performance of the fluid controller having both functions of the manual valve and the automatic valve or having either of the functions.

The invention claimed is:

1. A fluid controller comprising:
a diaphragm moved so as to open and close a fluid passage;
a diaphragm presser for moving the diaphragm to a closing position in which the fluid passage is in a closed state and an opening position in which the fluid passage is in an open state;
a disk, separately formed from the diaphragm presser, configured to hold at an end portion thereof the diaphragm presser; and
a tubular movable member, separately formed from the disk, configured to move the disk to a closing position or an opening position manually or automatically, wherein
the tubular movable member includes a tubular fitting portion in contact with an outer periphery of the disk, the disk is provided at a part thereof with a flange portion coming into contact with a flange portion of the tubular movable member at a time of movement of the tubular movable member,
moving means for moving the tubular movable member is means for automatic movement, which is performed by introduction or discharge of a compressed fluid to a compressed fluid introduction chamber formed in a casing,
a first cylinder portion and a second cylinder portion partitioned by a counter plate are formed in the casing, and the means for automatic movement includes a first piston guided in the first cylinder portion and moving integrally with the tubular movable member, and a second piston guided in the second cylinder portion and moving integrally with the tubular movable member, wherein
the tubular movable member consists of: a second tubular body having the fitting portion; and a first tubular body formed separately from the second tubular body, and
the first piston and the second piston are both formed separately from the tubular movable member,
wherein the first tubular body has an end portion that fits to the first piston and an intermediate portion that is provided with a flange coming into contact with the second piston.

2. The fluid controller according to claim 1, wherein
the casing includes a first casing and a second casing formed separately from the first casing,
and
the counter plate is provided on an outer periphery thereof with a male screw portion and on an inner periphery thereof with a female screw portion, the first screw portion is screwed to the first casing, and the second screw portion is screwed to the second casing.

3. The fluid controller according to claim 2, further comprising: manual movement means for moving the disk manually, wherein
the manual movement means includes a rodlike movable member for pressing the disk in one direction by being moved by manual operation, and
the rodlike movable member is moved by manual operation to an automatic opening and closing disabled position in which an end portion of the rodlike movable member presses a middle portion of a top surface of the disk in one direction and to an automatic opening and closing enabled position in which the end portion is away from the middle portion of the top surface of the disk, the tubular movable member is fitted to the rodlike movable member in a relatively movable manner, and is moved to a closing position in which the tubular movable member is biased by an elastic member and presses the disk in one direction and to an opening position in which an end portion of the tubular movable member is away from the flange portion of the disk by the means for automatic movement, and a closed state in an event of emergency is realized in which the rodlike movable member is moved to the closing position when the tubular movable member is in the opening position.

4. A fluid controller comprising:
a diaphragm moved so as to open and close a fluid passage;
a diaphragm presser for moving the diaphragm to a closing position in which the fluid passage is in a closed state and an opening position in which the fluid passage is in an open state;

a disk, separately formed from the diaphragm presser, configured to hold at an end portion thereof the diaphragm presser; and a tubular movable member, separately formed from the disk, configured to move the disk to a closing position or an opening position manually or automatically, wherein the tubular movable member includes a tubular fitting portion in contact with an outer periphery of the disk, and the disk is provided at a part thereof with a flange portion coming into contact with a flange portion of the tubular movable member at a time of movement of the tubular movable member, moving means for moving the tubular movable member is means for automatic movement, which is performed by introduction or discharge of a compressed fluid to a compressed fluid introduction chamber formed in a casing, the casing includes a first casing and a second casing formed separately from the first casing, a first cylinder portion and a second cylinder portion partitioned by a counter plate are formed in the casing, and the means for automatic movement includes a first piston guided in the first cylinder portion and moving integrally with the tubular movable member, and a second piston guided in the second cylinder portion and moving integrally with the tubular movable member, and the counter plate is provided on an outer periphery thereof with a male screw portion and on an inner periphery thereof with a female screw portion, the male screw portion is screwed to the first casing, and the female screw portion is screwed to the second casing, wherein the tubular movable member consists of: a second tubular body having the fitting portion; and a first tubular body formed separately from the second tubular body, and the first piston and the second piston are both formed separately from the tubular movable member, wherein the first tubular body has an end portion that fits to the first piston and an intermediate portion that is provided with a flange coming into contact with the second piston.

* * * * *